United States Patent [19]
Chambers et al.

[11] Patent Number: 5,796,994
[45] Date of Patent: Aug. 18, 1998

[54] PATCH MECHANISM FOR ALLOWING DYNAMIC MODIFICATIONS OF THE BEHAVIOR OF A STATE MACHINE

[75] Inventors: Peter Chambers; Roger Lee Shelton, both of Phoenix, Ariz.

[73] Assignee: VLSI Technology, Inc., San Jose, Calif.

[21] Appl. No.: 792,713

[22] Filed: Jan. 30, 1997

[51] Int. Cl.$^6$ ............................................. G06F 1/04
[52] U.S. Cl. ................................. 395/555; 395/500
[58] Field of Search ........................... 395/500, 555, 395/527

[56] References Cited

U.S. PATENT DOCUMENTS

| | | | |
|---|---|---|---|
| 3,937,936 | 2/1976 | Saporito | 395/182.09 |
| 4,233,682 | 11/1980 | Liebergot | 371/68.1 |
| 4,484,268 | 11/1984 | Thoma | 395/388 |
| 4,940,909 | 7/1990 | Mulder | 326/38 |
| 4,965,472 | 10/1990 | Anderson | 307/465 |
| 5,352,940 | 10/1994 | Watson | 326/44 |
| 5,394,557 | 2/1995 | Ellis | 395/555 |
| 5,498,975 | 3/1996 | Cliff | 326/10 |
| 5,508,636 | 4/1996 | Mange | 395/181 |

*Primary Examiner*—Eric Coleman
*Attorney, Agent, or Firm*—Harry M. Weiss; Jeffrey D. Moy; Harry M. Weiss & Associates, P.C.

[57] ABSTRACT

A patch mechanism for dynamic modification of the behavior of a state machine without interfering with normal operation of the state machine when modification is not required. The patch mechanism uses a programmable logic array for storing a modified transition and a modified output transition for an individual state of the state machine which is to be modified. A pair of multiplexer having inputs coupled to the state machine and inputs coupled to the programmable logic array are used for allowing the state machine to select either the current transition and the current output transition both defined by the state machine, or a modified transition and a modified output transition if a modification of the present state is required. A logic circuit coupled to the state machine and to both multiplexers will signal both multiplexers when it is valid to modify the present state to the modified transition and the modified output transition.

15 Claims, 2 Drawing Sheets

PATCH MECHANISM FOR ALLOWING DYNAMIC MODIFICATIONS OF THE BEHAVIOR OF A STATE MACHINE

BACKGROUND OF THE INVENTION

1. Field of the Invention

This invention relates generally to a modifiable state machine and, more specifically, to a patch mechanism which will allow for the post silicon modification of the behavior of a state machine without interfering with the normal operation of the state machine when modifications are not required.

2. Description of the Prior Art

Presently, a great majority of silicon designs employ synchronous state machines to control the characteristics and the behavior of the silicon designs. The state machines are generally implemented in fixed logic and are usually synthesized from a high level design language.

In general, all state machines have a finite number of states. However, many state machines are extremely complex in nature having many different states wherein each state may have many different transitions and outputs based on the operating conditions of the state machine. Due to the elaborate nature of many state machines, it is difficult to test all possible corner cases of a state machine. As such, many times after a silicon design employing synchronous state machines has been implemented, it is discovered that one or more of the synchronous state machines has been wrongly designed. This creates a serious problem since the state machines used in these silicon designs are fixed and not modifiable after the silicon has been produced. Presently, the only way to modify the behavior of the state machine after the silicon is produced is to make changes to the interconnect layers of the die which is an extremely complex and difficult procedure.

Therefore, a need existed to provide a patch mechanism for producing a dynamically modifiable synchronous state machine. The patch mechanism must be implemented using a minimal amount of silicon real estate. The patch mechanism must have a minimal effect on the performance of the state machine since many state machines are very critical in timing. The patch mechanism must be flexible such that it is possible to modify the behavior of the state machine arbitrarily making virtually any type of change given the constraints of inputs, outputs, and clock domain which are preexisting in the design. The patch mechanism also must be benign in that the patch mechanism must not interfere with the normal operation of the state machine when the patch mechanism is not in use.

SUMMARY OF THE INVENTION

In accordance with one embodiment of the present invention, it is an object of the present invention to provide a patch mechanism for producing a dynamically modifiable synchronous state machine.

It is another object of the present invention to provide a patch mechanism for producing a dynamically modifiable synchronous state machine which may be implemented using a minimal amount of silicon real estate.

It is another object of the present invention to provide a patch mechanism for producing a dynamically modifiable synchronous state machine wherein the patch mechanism will have a minimal effect on the performance of the state machine It is still another object of the present invention to provide a patch mechanism for producing a dynamically modifiable synchronous state machine wherein the patch mechanism is flexible such that it is possible to modify the behavior of the state machine arbitrarily making virtually any type of change given the constraints of inputs, outputs, and clock domain which are preexisting in the design.

It is still another object of the present invention to provide a patch mechanism for producing a dynamically modifiable state machine wherein the patch mechanism will not interfere with the normal operation of the state machine when the patch mechanism is not in use.

BRIEF DESCRIPTION OF THE PREFERRED EMBODIMENTS

In accordance with one embodiment of the present invention, a patch mechanism is disclosed which will allow for the dynamic modification of the behavior of a state machine without interfering with normal operation of the state machine when modifications are not required. The patch mechanism uses programmable logic array means for storing a modified transition for an individual state of the state machine to be modified from a current state to a modified next state. The programmable logic array means also is used for storing a modified output transition for the individual state of the state machine to be modified from a current output to a modified next output. Multiplexer means are provided and have inputs coupled to the state machine and inputs coupled to the programmable logic array means. The multiplexer means are used for allowing the state machine to select at least one of an unmodified current transition defined by the state machine and the modified transition of the programmable logic array. The multiplexer means are also used for allowing the state machine to select at least one of an unmodified output transition defined by the state machine and the modified output transition of the programmable logic array. Logic means are coupled to the state machine and to the multiplexer means for signalling the multiplexer means when it is valid to modify the specific individual state to be modified from the unmodified current transition defined by the state machine to the modified transition and from the unmodified output transition defined by the state machine to the modified output transition.

In accordance with another embodiment of the present invention, a state machine which will allow for dynamic modification of the state machine without interfering with normal operations of the state machine when modification is not required is disclosed. The state machine is comprised of a state machine unit having a finite number of individual states. Each of the individual states of the state machine unit has a current transition from a current state to a next state and a current output transition from a current output to a next output. Both the current transition and the current output transition are defined by the state machine and are based on the present state of the state machine and inputs to the state machine from outside sources. Patch mechanism means are coupled to the state machine unit for modifying an individual state of the state machine unit to have a new modified transition from the current state to a modified next state and to have a modified output transition from the current output to a modified next output. The patch mechanism means uses programmable logic array means for storing the modified transition for the individual state of the state machine unit to be modified from the current state to the modified next state and for storing the modified output transition for the individual state of the state machine unit to be modified from the current output to the modified next output. Multiplexer means are also part of the patch mechanism. The multiplexer means have inputs coupled to the state machine unit and inputs coupled to the programmable logic array means. The multiplexer means are used for allowing the state machine unit to output at least one of the current transition defined by the state machine unit and the modified transition and for allowing the state machine unit to output at least one of the output transition defined by the state machine unit and the modified output transition. Logic means are coupled to the state machine unit and to the multiplexer means for signalling the multiplexer means when it is valid to modify the individual state to be modified from the current transition defined by the state machine unit to the modified transition and from the output transition defined by the state machine unit to the modified output transition.

The foregoing and other objects, features, and advantages of the invention will be apparent from the following, more particular, description of the preferred embodiments of the invention, as illustrated in the accompanying drawings.

DETAILED DESCRIPTION OF THE PREFERRED EMBODIMENTS

Figure 1:
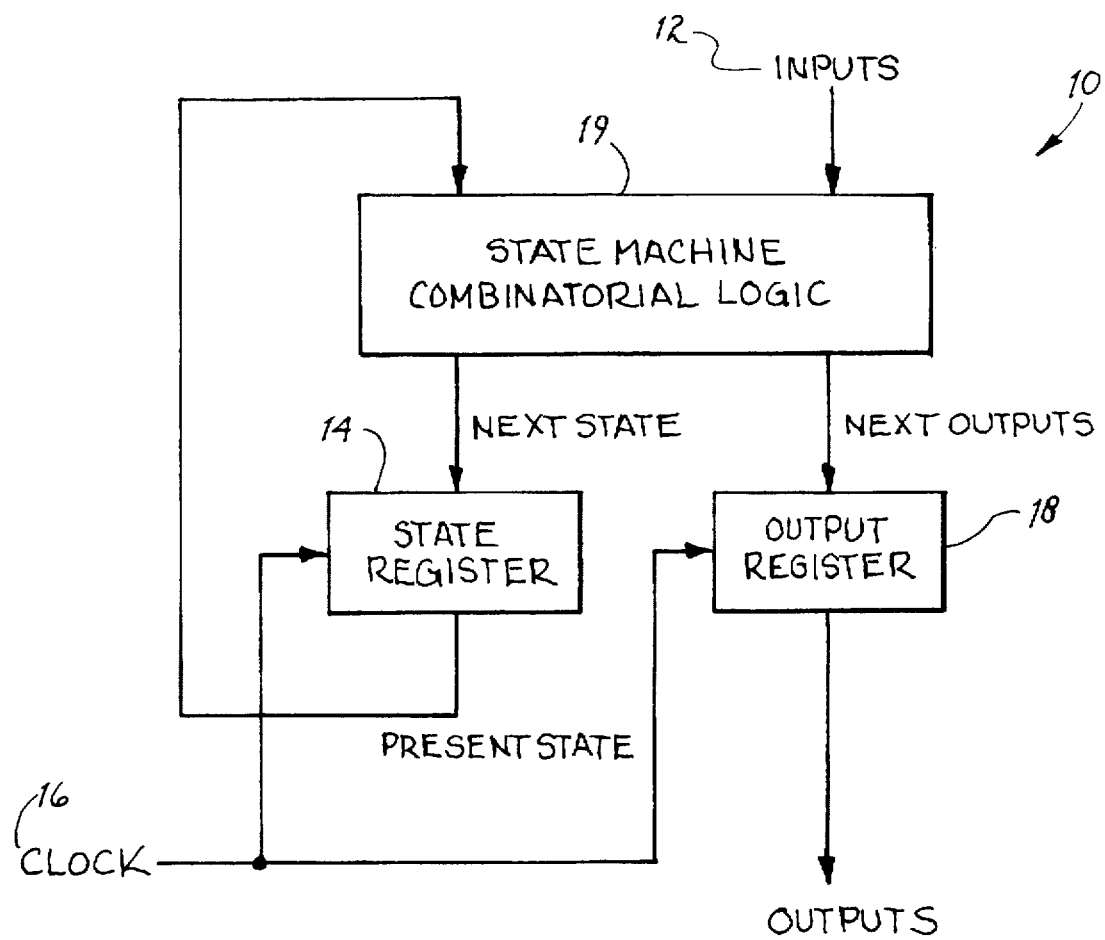
FIG. 1 is a simplified functional block diagram of a prior art synchronous state machine.

Referring to FIG. 1, a prior art synchronous state machine 10 (hereinafter state machine 10) is disclosed. Presently, a great majority of silicon designs employ state machines 10 to control the characteristics and the behavior of the silicon design. Generally speaking, the state machine 10 is a piece of sequential clocked digital logic. The state machine 10 is based on a finite number of sequences (i.e., states). The state machine 10 may exist in any one particular state at any one time. At each clock edge, the state machine will update the state the state machine 10 is currently at based on the present state of the state machine 10 and inputs 12 to the state machine 10.

The state machine 10 has a state register 14 which has an input coupled to a clock signal 16. The state register 14 is used for storing and outputting the present state of the state machine 10. At each edge of the clock signal 16, the state register 14 will be updated with a new present state of the state machine 10.

The state machine 10 also has an output register 18. Like the state register 14, the output register 18 has an input coupled to the clock signal 16. The output register 18 is used for storing and outputting the present output for the present state the state machine 10 is currently operating under. At each edge of the clock signal 16, the output register 18 will be updated with a new present output based on the new present state the state machine 10 is currently operating under and input 12 to the state machine 10.

Both the state register 14 and the output register 18 are updated by a state machine logic unit 19. The state machine logic unit 19 has a first input coupled to an output of the state register 14 and a second input coupled to an input 12. The input 12 is usually from a device (not shown) that the state machine 10 is used to control. The state machine logic unit 19 further has a first output coupled to an input of the state register 14 and a second output coupled to an input of the output register 18. The state machine logic unit 19 is used for updating the state register 14 by generating a current transition from the present state to a next state and for updating the output register 18 by generating a current output transition from the current output to a next output for each of the finite number of individual states of the state machine 10. The updated data received by the state register 14 and the output register 18 (i.e., next state and next output) are based on the inputs to the state machine logic unit 19 (i.e., the present state the state machine 10 is currently operating under and input 12 from the device whose characteristics and behavior the state machine 10 is used to control).

Figure 2:
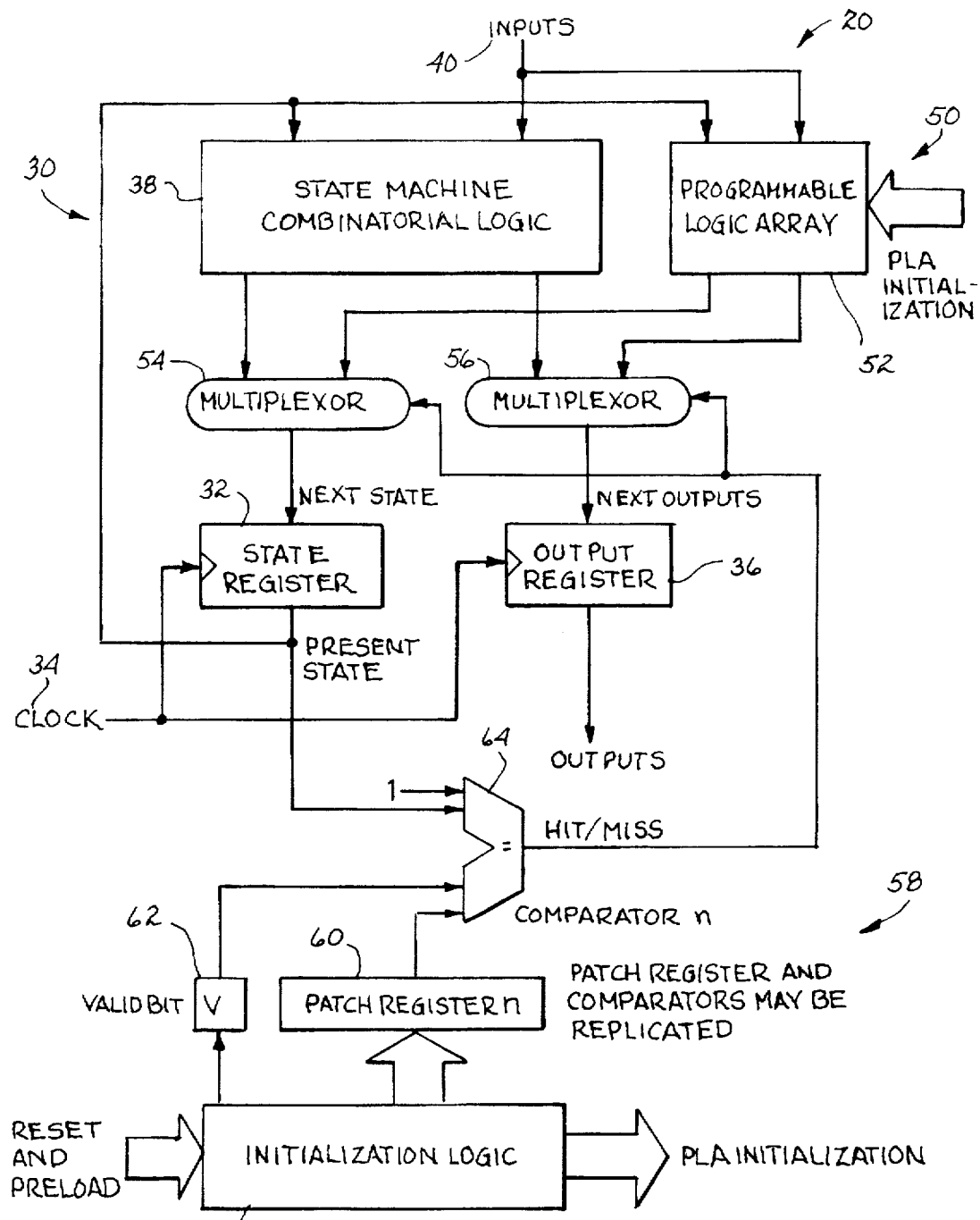
FIG. 2 is a simplified functional block diagram of a modifiable synchronous state machine.

As stated before, the state machine 10 is generally fixed and not modifiable after the silicon has been produced except for extremely difficult procedures such as making changes to the interconnect layers of the die. Referring to FIG. 2, a dynamic modifiable state machine 20 (hereinafter state machine 20) is shown. The state machine 20 is modifiable even after the state machine unit 30 has been implemented in silicon. The state machine 20 uses a patch mechanism 50 to modify the transitions, the outputs and the overall behavior of the state machine unit 30.

The state machine unit 30 is similar to the prior art state machine 10 discussed above. The state machine unit 30 has a state register 32 which has an input coupled to a clock signal 34. The state register 32 is used for storing and outputting the present state of the state machine unit 30. At each edge of the clock signal 34, the state register 32 will be updated with a new present state of the state machine unit 30.

The state machine unit 30 also has an output register 36. The output register 36 also has an input coupled to the clock signal 34. The output register 36 is used for storing and outputting the present output for the present state the state machine unit 30 is currently operating under. At each edge of the clock signal 34, the output register 36 will be updated with a new output based on the new present state the state machine unit 30 is currently operating under and input 40 to the state machine unit 30.

The state register 32 and the output register 36 are updated by a state machine logic unit 38. The state machine logic unit 38 has a first input coupled to an output of the state register 32 and a second input coupled to an input 40. The input 40 is generally coupled to a device (not shown) that the state machine unit 30 is used to control. The state machine logic unit 38 further has a first output coupled to an input of the state register 32 and a second output coupled to an input of the output register 36. The state machine logic unit 38 is used for updating the state register 32 by generating a current transition from the present state to a next state and for updating the output register 36 by generating a current output transition from the current output to a next output for each of the finite number of individual states of the state machine unit 38. The updated data received by the state register 32 and the output register 36 (i.e., next state and next output) are based on the inputs to the state machine logic unit 38 (i.e., the present state the state machine unit 30 is currently operating under and input 40 from the device whose characteristics and behavior the state machine unit 30 is used to control).

The state machine logic unit 38 is implemented in fixed logic. The state machine logic unit 38 is usually synthesized from a high level design language such as VHDL or Verilog. As such, once the state machine unit 30 is implemented in silicon, it cannot be modified except through the most difficult of procedures such as making changes to the interconnect layers of the die.

A patch mechanism 50 is coupled to the state machine unit 30. The patch mechanism 50 provides an easier way for modifying individual states of the state machine unit 30 which need to be modified. The patch mechanism 50 is able to modify individual states of the state machine unit 30 by modifying the current transition of the present state. The current transition of a present state is defined by the state machine logic unit 38 and cannot be changed once the state machine unit 30 is fixed in silicon. The current transition will change from a present state to a next state based on the present state inputted to the state machine logic unit 38 and the input 40 to the state machine logic unit 38 from the device the state machine unit 30 is designed to control. The patch mechanism 50 will allow an individual to modify the current transition to a modified transition. The modified transition will transition from the present state the state machine unit 30 is currently at to a modified next state which may be defined by the individual using the patch mechanism 50.

The patch mechanism 50 is also able to modify individual states of the state machine unit 30 by modifying the current output transition of the present state. The current output transition of a present state is defined by the state machine logic unit 38 and cannot be changed once the state machine unit 30 is fixed in silicon. The current output transition will change from a present output to a next output based on the present state inputted to the state machine logic unit 38 and the input 40 to the state machine logic unit 38 from the device the state machine unit 30 is designed to control. The patch mechanism 50 will allow an individual to modify the current output transition to a modified output transition. The modified output transition will transition from a present output for the current state that the state machine unit 30 is under to a modified next output which can be defined by the individual using the patch mechanism 50.

The patch mechanism 50 uses a programmable logic array (PLA) 52 for storing the modified transition and the modified output transition for the particular state of the state machine unit 30 that is to be modified. In the preferred embodiment of the present invention, the PLA 52 is a standard sum-of-products PLA. A standard sum-of-products PLA is preferred since it represents the best compromise between silicon area and flexibility. However, other PLAs besides the standard sum-of-products PLA could be used. For example, a user programmable Random Access Memory (RAM) based PLA may be used. However, if the new behavior of the state machine unit 30 is speed critical, then a RAM based PLA may not be fast enough. However, this may not be that important if the patch mechanism 50 is not intended for production silicon, but instead is used as a powerful debugging tool.

The patch mechanism 50 uses a pair of multiplexers 54 and 56 to select between the current transition and the modified transition and between the current output transition and the modified output transition. The first multiplexer 54 has a first input coupled to the state machine logic unit 38 and a second input coupled to the PLA 52. The output of the first multiplexer 54 is coupled to an input of the state register 32. Under normal operation, the state machine logic unit 38 will output the next state which is defined by the state machine logic unit 38 based on the current state of the state machine unit 30 and the input 40 from the device the state machine unit 30 is designed to control. The output of the next state is sent through the first multiplexer 54 and is used to update the state register 32. If the present state is to have a modified transition, the first multiplexer 54 will be signaled to send a modified next state from the PLA 52 to the state register 32.

The second multiplexer 56 acts in a similar manner to the first multiplexer 54 but is used to select between the next state defined by the state machine logic unit 38 and the modified next state stored in the PLA 52. The second multiplexer 56 has a first input coupled to the state machine logic unit 38 and a second input coupled to the PLA 52. The output of the second multiplexer 56 is coupled to an input of the output register 36. Under normal operation, the state machine logic unit 38 will output the next output which is defined by the state machine logic unit 38 based on the current state of the state machine unit 30 and the input 40 from the device the state machine unit 30 is designed to control. The output of the next output is sent through the second multiplexer 56 and is used to update the output register 36. If the present state is to have a modified output transition, the second multiplexer 54 will be signaled to send a modified next output from the PLA 52 to the output register 36.

Both the first multiplexer 54 and the second multiplexer 56 have inputs coupled to a logic circuit 58. The logic circuit 58 is used to signal both multiplexers 54 and 56 when it is valid to modify a specific state defined by the state machine unit 30 from the current transition defined by the state machine unit 30 to the modified transition and from the current output transition defined by the state machine unit 30 to the modified output transition.

The logic circuit 58 has a patch register 60 which is used for storing a number of the specific state defined by the state machine unit 30 which is to be modified. Within the patch register 60 is a valid bit 62. The valid bit 62 is used for indicating when the patch register 62 is storing a valid number of the specific individual state of the state machine unit 30 which is to be modified.

The logic circuit 58 has a comparator 64. The comparator 64 has an input coupled to an output of the state register 32 and another input coupled to the patch register 60. The comparator 64 is used to compare a present state of the state machine unit 30 with the number of the individual state to be modified which is stored in the patch register 60. If a match is detected, the comparator 64 signals both multiplexers 54 and 56 to modify the present state by outputting the modified transition and the modified output transition respectively which are stored in the PLA 52.

The logic circuit 58 further has an initialization logic circuit 66. The initialization logic circuit 66 is coupled to the patch register 60 and to the PLA 52. The initialization logic circuit 66 is used for loading the patch register 60 with the number of the specific individual state of the state machine unit 30 which is to be modified and for setting the valid bit 62 of the patch register 60 when the patch register 60 stores a valid number of the specific individual state which is to be modified. The initialization logic circuit 66 is further used for loading the PLA 52 with the modified transition and the modified output transition for the individual state of the state machine unit 30 which is to be modified.

It should be noted that in FIG. 2 only one patch register 60 and one comparator 64 is shown. However, in accordance with the preferred embodiment of the present invention, in order to make changes to two or more states of the state machine unit 30, a patch register 60 and a comparator 64 is required for every state of the state machine unit 30 that need to be modified.

OPERATION

The patch mechanism will not interfere with the normal operation of the state machine unit 30. During normal operation, the state machine logic unit 38 will output the next state which is defined by the state machine logic unit 38 based on the current state of the state machine unit 30 and the input 40 from the device the state machine unit 30 is designed to control. The output of the next state is sent through the first multiplexer 54 and is used to update the state register 32. The state machine logic unit 38 also will output the next output which is defined by the state machine logic unit 38 based on the current state of the state machine unit 30 and the input 40 from the device the state machine unit 30 is designed to control. The next output is sent through the second multiplexer 56 and is used to update the output register 36. If a specific individual state of the state machine unit 30 needs to be modified, the initialization logic 66 will load the patch register 60 with the specific state which needs to be modified. The initialization logic 66 will then set the valid bit 62 of the of the patch register 60 if the patch register contains a valid entry. The initialization logic 66 will then load the PLA 52 with the modified transition and the modified output transition for the specific individual state that is to be modified. The comparator 64 will compare the contents of the state register 32 with the contents stored in the patch register 60. If the comparator 64 detects a valid match between the present state of the state machine unit 30 and the contents of the patch register 60, the first and second multiplexers 54 and 56 are switched so that the state register 32 and the output register 36 take their respective inputs from the PLA 52 rather than from the state machine logic unit 38.

While the invention has been particularly shown and described with reference to preferred embodiments thereof, it will be understood by those skilled in the art that the foregoing and other changes in form, and details may be made therein without departing from the spirit and scope of the invention.

What is claimed is:

1. A patch mechanism for dynamic modification of the behavior of a state machine without interfering with normal operation of said state machine when modification is not required comprising, in combination:

programmable logic array means for storing a modified transition for an individual state of said state machine to be modified from a current state to a modified next state and for storing a modified output transition for said individual state of said state machine to be modified from a current output to a modified next output;

multiplexer means having inputs coupled to said state machine having said individual state to be modified and inputs coupled to said programmable logic array means for allowing said state machine to select at least one of an unmodified current transition defined by said state machine and said modified transition and for allowing said state machine to select at least one of an unmodified output transition defined by said state machine and said modified output transition; and logic means coupled to said state machine and to said multiplexer means for signalling said multiplexer means when it is valid to modify said individual state to be modified from said unmodified current transition defined by said state machine to said modified transition and from said unmodified output transition defined by said state machine to said modified output transition.

2. The patch mechanism of claim 1 wherein said programmable logic array means is a sum-of-products programmable logic array.

3. The patch mechanism of claim 1 wherein said programmable logic array means is a user programmable Random Access Memory (RAM) based programmable logic array.

4. The patch mechanism of claim 1 wherein said multiplexer means comprises:

a first multiplexer having a first input coupled to said state machine, a second input coupled to said programmable logic array means, and a third input coupled to said logic means for storing and outputting at least one of said unmodified current transition defined by said state machine and said modified transition; and a second multiplexer having a first input coupled to said state machine, a second input coupled to said programmable logic array means, and a third input coupled to said logic means for storing and outputting at least one of said unmodified output transition defined by said state machine and said modified output transition.

5. The patch mechanism of claim 1 wherein said logic means comprises:

patch register means for storing a number of said individual state to be modified wherein said patch register means has a valid bit for indicating when said patch register means is storing a valid number of said individual state to be modified;

comparator means coupled to said state machine and to said patch register means for comparing said current state of said state machine with said number of said individual state to be modified stored in said patch register means and for signalling said multiplexer means to modify said individual state to be modified by outputting said modified transition and said modified output transition when a valid match is detected by said comparator means; and initialization logic means coupled to said patch register means and coupled to said programmable logic array means for loading said patch register means with said number of said individual state to be modified, for setting said valid bit when said patch register means is storing said valid number of said individual state of said state machine to be modified; and for loading said programmable logic array means with said modified transition and said modified output transition for said individual state of said state machine to be modified.

6. A patch mechanism for dynamic modification of the behavior of a state machine without interfering with normal operation of said state machine when modification is not required comprising, in combination:

programmable logic array means for storing a modified transition for an individual state of said state machine which is to be modified from a current state to a modified next state and for storing a modified output transition for said individual state of said state machine to be modified from a current output to a modified next output;

multiplexer means having inputs coupled to said state machine having said individual state to be modified and inputs coupled to said programmable logic array means for allowing said state machine to select at least one of an unmodified current transition defined by said state machine and said modified transition and for allowing said state machine to select at least one of an unmodified output transition defined by said state machine and said modified output transition, said multiplexer means comprising:

a first multiplexer having a first input coupled to said state machine, a second input coupled to said programmable logic array means, and a third input coupled to said logic means for storing and outputting at least one of said unmodified current transition defined by said state machine and said modified transition; and a second multiplexer having a first input coupled to said state machine, a second input coupled to said programmable logic array means, and a third input coupled to said logic means for storing and outputting at least one of said unmodified output transition defined by said state machine and said modified output transition; and logic means coupled to said state machine and to said multiplexer means for signalling said multiplexer means when it is valid to modify said individual state to be modified from said unmodified current transition defined by said state machine to said modified transition and from said unmodified output transition defined by said state machine to said modified output transition, said logic means comprising:

patch register means for storing a number of said individual state to be modified wherein said patch register means has a valid bit for indicating when said patch register means is storing a valid number of said individual state to be modified;

comparator means coupled to said state machine and to said patch register means for comparing said current state of said state machine with said number of said individual state to be modified stored in said patch register means and for signalling said multiplexer means to modify said individual state to be modified by outputting said modified transition and said modified output transition when a valid match is detected by said comparator means; and initialization logic means coupled to said patch register means and coupled to said programmable logic array means for loading said patch register means with said number of said individual state to be modified, for setting said valid bit when said patch register means is storing said valid number of said individual state of said state machine to be modified; and for loading said programmable logic array means with said modified transition and said modified output transition for said individual state of said state machine to be modified.

7. The patch mechanism of claim 6 wherein said programmable logic array means is a sum-of-products programmable logic array.

8. The patch mechanism of claim 6 wherein said programmable logic array means is a user programmable Random Access Memory (RAM) based programmable logic array.

9. A state machine which will allow for dynamic modification of said state machine without interfering with normal operation of said state machine when modification is not required comprising, in combination:

a state machine unit having a finite number of individual states wherein each of said finite number of individual states of said state machine unit has a current transition from a current state to a next state and a current output transition from a current output to a next output; and patch mechanism means coupled to said state machine unit for modifying an individual state of said state machine unit to have a modified transition from said current state to a modified next state and to have a modified output transition from said current output to a modified next output.

10. The state machine of claim 9 wherein said state machine unit comprises:

state register means having an input coupled to a clock signal for storing and outputting said current state of said state machine unit;

output register means having an input coupled to said clock signal for storing and outputting said current output for said current state said state machine unit is operating under; and state machine unit logic means having a first input coupled to an output of said state register means, a second input coupled to a device said state machine unit is to control, a first output coupled to an input of said state register means, and a second output coupled to an input of said output register means for generating said current transition from said current state to said next state and for generating said current output transition from said current output to said next output for each of said finite number of individual states of said state machine unit based on said current state said state machine unit is operating under and said input from said device.

11. The state machine of claim 9 wherein said patch mechanism means comprises:

programmable logic array means for storing said modified transition for said individual state of said state machine unit to be modified from said current state to said modified next state and for storing said modified output transition for said individual state of said state machine unit to be modified from said current output to said modified next output;

multiplexer means having inputs coupled to said state machine unit having said individual state to be modified and inputs coupled to said programmable logic array means for allowing said state machine unit to output at least one of said current transition defined by said state machine unit and said modified transition and for allowing said state machine unit to output at least one of said current output transition defined by said state machine unit and said modified output transition; and logic means coupled to said state machine unit and to said multiplexer means for signalling said multiplexer means when it is valid to modify said individual state to be modified from said current transition defined by said state machine unit to said modified transition and from said current output transition defined by said state machine unit to said modified output transition.

12. The state machine of claim 11 wherein said programmable logic array means is a sum-of-products programmable logic array.

13. The state machine of claim 11 wherein said programmable logic array means is a user programmable Random Access Memory (RAM) based programmable logic array.

14. The state machine of claim 11 wherein said multiplexer means comprises:

a first multiplexer having a first input coupled to said state machine unit, a second input coupled to said programmable logic array means, and a third input coupled to said logic means for storing and outputting at least one of said current transition defined by said state machine unit and said modified transition; and a second multiplexer having a first input coupled to said state machine unit, a second input coupled to said programmable logic array means, and a third input coupled to said logic means for storing and outputting at least one of said current output transition defined by said state machine unit and said modified output transition.

15. The state machine of claim 11 wherein said logic means comprises:

patch register means for storing a number of said individual state to be modified wherein said patch register means has a valid bit for indicating when said patch register means is storing a valid number of said individual state to be modified;

comparator means coupled to said state machine unit and to said patch register means for comparing said current state of said state machine unit with said number of said individual state to be modified stored in said patch register means and for signalling said multiplexer means to modify said individual state to be modified by outputting said modified transition and said modified output transition when a valid match is detected by said comparator means; and initialization logic means coupled to said patch register means and coupled to said programmable logic array means for loading said patch register means with said number of said individual state to be modified, for setting said valid bit when said patch register means is storing said valid number of said individual state of said state machine unit to be modified; and for loading said programmable logic array means with said modified transition and said modified output transition for said individual state of said state machine unit to be modified.

* * * * *